United States Patent Office 2,822,782
Patented Feb. 11, 1958

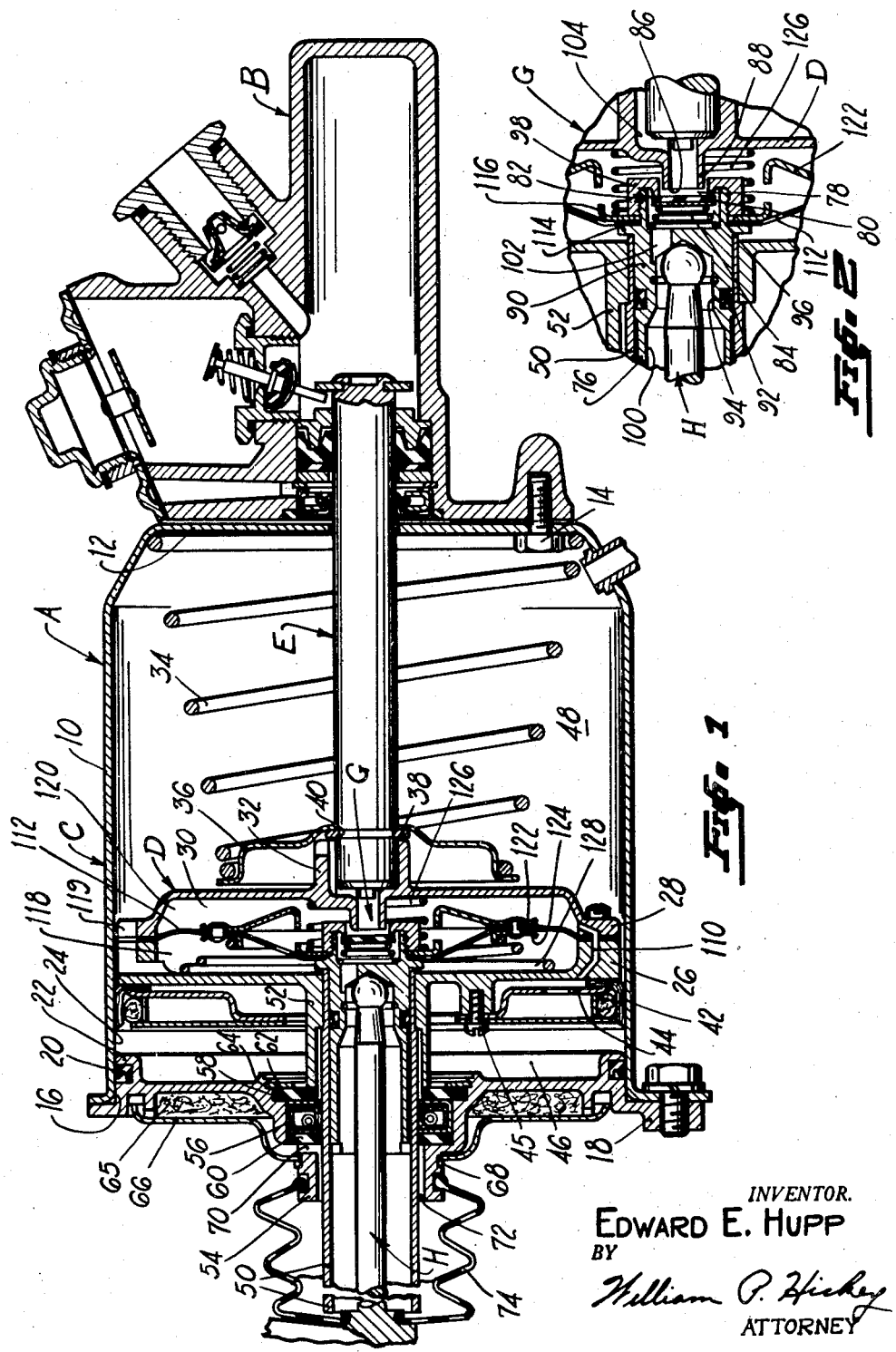

2,822,782
PNEUMATIC SERVO-MOTOR

Edward E. Hupp, South Bend, Ind., assignor to Bendix Aviation Corporation, South Bend, Ind., a corporation of Delaware Application December 14, 1955, Serial No. 553,089

2 Claims. (Cl. 121—41)

The present invention relates to servo-motors and more particularly to pneumatic servo-motors of the type adaptable for use with hydraulic pressurizing devices and the like.

An object of the present invention is the provision of a new and improved pneumatic servo-motor of a simple and rugged design whose power piston accurately positions itself with a minimum of lost motion in response to movement of the servo-motor's control member.

Another object of the invention is the provision of a new and improved pneumatic servo-motor having control valve structure of large capacity attached to its movable wall and which can be operated with a minimum of relative movement between its control member and the movable wall.

Another object of the invention is the provision of a new and improved pneumatic servo-motor of the vacuum suspended type in which the movable wall is provided with a tubular member which projects through and slidingly engages one end wall of the servo-motor to seal therewith and which tubular member conducts air pressure to the inside of a generally cup shaped valve member having an internally positioned valve closure member biased against a first valve seat surrounding a port in the bottom end of the cup shaped valve member and which closure member is adapted to be moved off of its seat against the air pressure by being moved against a second valve seat situated on the end of a second generally tubular valve member adapted to project through said port.

A further object of the invention is the provision of a new and improved pneumatic servo-motor of the above described type which is simple in design, rugged in construction, and inexpensive to manufacture.

The invention resides in certain constructions and combinations and arrangements of parts and further objects and advantages will be apparent to those skilled in the art to which the invention relates from the following description of the preferred embodiment described with reference to the accompanying drawing forming a part of this specification, in which:

Figure 1 is a cross sectional view of a power operated master cylinder for operating braking systems of road vehicles and the like, and embodying the principles of the present invention; and Figure 2 is a fragmentary enlarged sectional view of a portion of the device shown in Figure 1.

While the present invention relates to pneumatic servo-motors adaptable to power various types of devices, it is herein shown as embodied in a power operated hydraulic master cylinder unit A, adaptable for use in the hydraulic braking systems of road vehicles and the like. The power operated hydraulic master cylinder unit A, shown in the drawing, generally comprises a hydraulic cylinder B attached to one end of a fluid pressure servo-motor C having a movable wall D therein connected to one end of a fluid displacement member E, the other end of which extends into the hydraulic cylinder B for developing fluid pressure therein. Power operation of the unit A is produced by supplying fluid pressure of different intensities to opposite sides of the movable wall D. Valve means G associated with the movable wall D controls this fluid pressure. The valve means G is regulated or positioned by means of a control member, or push rod H, one end of which is operatively connected to the valve means G and the other end of which extends externally of the unit A where it may be positioned or controlled by an operator, in a manner well known in the art. For a more complete description of the construction and operation of the hydraulic cylinder B, which forms no part of the present invention, reference may be had to Patent No. 2,690,740.

While the principles of the present invention may be embodied in various types of fluid pressure servo-motors, including those of the diaphragm type, it is herein shown and described as being incorporated in a fluid pressure motor of the piston and cylinder type designated by the letter C. The power cylinder 10, shown in the drawing, is a generally cup shaped structure, to the bottom or closed end 12 of which is mounted the hydraulic cylinder B as by bolts 14. The open end 16 of the cylinder 10 is provided with a closure or cover member 18 bolted in place and provided with a U-shaped pressure sealing ring 20 which is carried by an inwardly extending circumferential boss 22, and which sealing ring 20 engages or seals against the internal surface 24 of the cylinder 10. (The end of the cylinder provided with the closure member 18 is normally positioned closest to the operation and will be hereinafter referred to as the front or forwardly positioned end.)

The movable wall D, which is of the piston type, is formed from two sections, a front section 26 and rear section 28, to conveniently provide an internal piston or diaphragm chamber 30. The rear section 28 is provided with an axially rearwardly extending annular boss 32 adapted to receive one end of the fluid displacement member E the other end of which, as previously explained, extends into the hydraulic cylinder B. The fluid displacement member E, and in turn the movable wall D, is biased forwardly by a helical coil spring 34 one end of which bears against the inside of the bottom end 12 of the cylinder B and the other end of which bears against an annular spring retainer plate 36 which in turn bears against a snap ring 38 carried in a groove 40 in the fluid displacement member E adjacent the movable wall D. The front section 26, of the movable wall D, is provided with an annular pressure seal 42 which bears against the side walls of the cylinder 10 to form a seal therewith. The seal is fastened to its front face by means of a pair of annular retainer plates 44 and machine screws 45. It will be seen therefore that the movable wall D divides the cylinder 10 into front and rear opposed power chambers 46 and 48, respectively.

The servo-motor C shown in the drawing is of the vacuum submerged type in which vacuum is supplied to the rearwardly positioned power chamber 48 at all times and whose valve means G normally communicates said vacuum to the front power chamber 46 when the piston is in its forwardly or retracted position as shown in Figure 1. Atmospheric pressure is supplied to the valve means G by means of an axially positioned tube 50, one end of which is attached as by a press fit to an axially positioned annular boss 52 on the front face of the front section 26 of the movable wall D and the other end of which extends externally of the cover member 18 of the power cylinder 10. The cover member 18 is provided with an axially outwardly extending annular boss or hub 54 which is counterbored from the inside to receive a vacuum seal 56 which slidably engages the tube 50 to provide a vacuum seal therewith. The vacuum seal 56 is positioned between inner and outer washers 58 and 60, respectively, preferably made from a non-metallic material. The outer guide washer 60 abuts the bottom of the counterbore and the inner stop washer 58 is retained in position by a snap-ring 62 positioned in a groove 64 adjacent the inner end of the hub 54. Air is admitted to the tube 50 through filter material 65 held against the outer surface of the cover member 18 by an annular plate 66 secured to the hub 54 by a snap ring 68, a plurality of radially extending holes 70 in the hub 54 which connect with the annular clearance 72 between the hub 54 and tube 50 into an annular rubber boot 74 positioned on the outer end of the hub 54 and into which the tube 50 projects.

The valve means G, comprises a first valve member 76 having an end port 78 which is closed by an internal valve closure member 80 biased against an internal valve seat 82, as by a spring 84, and which closure member is adapted to be moved away from the valve seat 82 or opened by a second valve seat 86 on the end of a second tubular valve member 88 adapted to project into the end port 78 of the first valve member 76 and bear against the valve closure member 80. The first valve member 76 comprises a generally cylindrical member slidably positioned in the inner end of the tube 50 and is provided with an annular pressure seal 92 of U-shaped cross-section seated in a groove 94 in the outer surface of the cylindrical member 76 and adapted to sealingly abut the internal walls of the tube 50. The inner end of the cylindrical member is bored out to provide an internal valve chamber 96 adapted to receive the spring 84 and valve closure member 80 which are retained by a removable cap 98 provided with the valve port 78 and internal valve seat 82 and which is threadedly connected to the inner end of the cylindrical member 76. The outer end of the cylindrical member 76 is bored out, as at 100, to receive the spherically shaped end of the push rod H, and a passageway 102 is provided connecting the bore 100 and the internal valve chamber 96 to communicate atmospheric pressure to the internal valve chamber 96.

The second tubular valve member 88 of the valve means G is fixedly attached to the movable wall D and in fact is cast integrally with the rear section 28 of the movable wall D as a tubular projection 88 which carries the second valve seat 86 on its outer end. The tubular projection 88 communicates vacuum from the rear power chamber 48 to the rear diaphragm chamber 30 by means of passageway 104 in the rear section 28 of the movable wall D, and the tubular projection 88 is adapted to be closed off when its valve seat 86 is abutted by the closure member 80. With the movable wall D in its retracted position and the valve means G is in its unapplied position, as shown in Figure 1, vacuum is communicated to the piston chamber 30 and thence through passageway 110 through sections 26 and 28 of the movable wall D to the front power chamber 46 to provide the vacuum submerged condition of the servo-motor.

The servo-motor C, shown in the drawing, is also provided with reaction means adapted to apprise the operator of the amount of force being developed by the servo-motor. In the embodiment shown this is accomplished by means of a reaction diaphragm 112 attached to the first or movable valve member 76. A centrally located opening in the diaphragm 112 permits the central portion of the diaphragm to be positioned about the valve member 76 and to be clamped between a shoulder 114 provided on the valve member 76 and an annular stiffening plate 116 against which the screwed cap 98 is adapted to be tightened. The radially outer end of the diaphragm 112 is clamped between the front and rear sections 26 and 28, respectively, of the movable wall D to provide opposed diaphragm chambers 118 and 120 into which pressure from power chambers 48 and 46, respectively, is transmitted by passageways 119 and 110, respectively.

It will be seen therefore, that the same differential pressure which is supplied across the piston is transmitted to the diaphragm in a reverse direction to provide a reaction to the operator indicative of the force being developed in the hydraulic cylinder D. As a further refinement, the diaphragm 112 is designed to transmit its reaction to the first or movable valve member 76 in two stages. This is accomplished by attaching an annular pick-up plate 122 to the back side of the diaphragm as by positioning the center portion of the diaphragm between the plate 122 and an annular stiffening plate 124 by means of rivets. A cylindrical coil spring 126 urges the cylindrical valve member 76 forwardly out of engagement with the tubular projection 88; and a helical coil spring 128 is positioned between the stiffening plate 124 and the front face of the internal piston chamber 30 to bias the pick-up plate 122 out of engagement wtih the stiffening plate 116 attached to the first or movable valve member 76. A more complete understanding of the construction and operation of the two stage diaphragm structure may be had by reference to the aforementioned patent. Suffice it to say that the initial reaction is produced solely by the central portion of the diaphragm and after a predetermined magnitude of differential pressure is produced across the diaphragm, the pick-up plate 122 is moved into engagement with the stiffening plate 116 and its full effect applied to the first or movable valve member 76.

*Operation*

In the retracted or unapplied position of the servo-motor B, the movable wall D is biased to its forward position as shown in Figure 1 by means of helical spring 34 until the axially positioned annular boss 52 abuts the composition washer 58 on the cover plate 18. In this position, vacuum, which is always supplied to the rear power chamber 48, is admitted to the forward power chamber 46 by means of passageway 104, rear diaphragm chamber 120 and passageway 110. Upon movement of the push rod H into the servo-motor, the movable valve member 76 is moved inwardly to force valve closure member 80 against the second tubular valve member 88, thereby closing off vacuum communication between the power chambers 46 and 48 and admitting air pressure to diaphragm chamber 120 and the front power chamber 46. When the approximate degree of force desired to be delivered by the servo-motor is achieved, the push-rod H is held stationary such that the movable wall will move rearwardly a slight amount to permit the valve closure member 80 to again abut seat 82 of the movable valve member 76. In this lapped position of the valve structure G, neither additional vacuum nor additional air pressure will be admitted to the forward power chamber 46 and the movable wall will remain stationary. If it is desired to reduce the force developed by the servo-motor B, the push-rod H may be retracted a desired distance to allow the movable wall D to be forced forwardly by the fluid displacement member E in conjunction with the helical spring 34. During the time that the push-rod H was being retracted, valve closure member 80 abutted valve seat 82 to prevent entrance of air pressure, and the second valve seat 86 was opened to decrease the pressure in the forward power chamber 46. When the push-rod H is held stationary in its new position, the movable wall moves forwardly to cause the second valve seat 86 to again abut the valve closure member 80 and the valve structure G assumes a new lapped position. If the push-rod H is fully retracted, the valve structure G and movable wall D will again assume the position shown in Figure 1.

From the foregoing description of the preferred embodiment of the invention, it will be apparent that the objects heretofore enumerated and others have been accomplished. While the preferred embodiment of the invention has been shown and described in detail, the invention is not limited to the particular construction shown and it is my intention to cover hereby all adaptations, modifications and uses thereof which come within the practice of those skilled in the art to which the invention relates and within the scope of the appended claims.

I claim:
1. A vacuum suspended fluid pressure servo-motor comprising a power chamber, a movable wall in said power chamber dividing said power chamber into front and rear opposed power chambers, said movable wall having a first axially positioned tubular projection extending through the front opposed chamber and the front end wall of said power chamber and communicating with the atmosphere, said movable wall having an internal diaphragm chamber therein, a first generally tubular valve member slidably supported in said tubular projection of said movable wall and extending into said diaphragm chamber for abutment with the rear surface of said diaphragm chamber, said valve member having an inner end closure wall provided with an axially positioned valve port therethrough, a valve seat inside of said generally tubular valve member surrounding said valve port, a valve closure member in said generally tubular valve member biased against said valve seat for regulating the flow of atmospheric pressure from said tubular projection into said diaphragm chamber, a second axially positioned tubular projection on said rear wall of said diaphragm chamber extending into said diaphragm chamber and adapted to project into said valve port of said first valve member, a valve seat on the end of said second tubular projection adapted to abut said valve closure member, means communicating vacuum to the rear opposed power chamber, means communicating said rear opposed power chamber with the inside of said second tubular projection of said movable wall, a reaction diaphragm affixed to the portion of said first valve member in said diaphragm chamber, and means operatively connected to said first generally tubular valve member and projecting through said first tubular projection of said movable wall for moving said first generally tubular valve member toward said second tubular projection of said movable wall to cause said valve seat on said second tubular projection to abut said valve closure member and thereafter move the valve closure member away from its seat in said first generally tubular valve member, whereby simple and reliable structure is provided for maintaining vacuum in both opposed chambers until said tubular valve member is moved inwardly.

2. A vacuum suspended fluid pressure servo-motor comprising a power chamber, a movable wall in said power chamber dividing said power chamber into front and rear opposed power chambers, said movable wall having a first axially positioned tubular projection extending through the front opposed chamber and the front end wall of said power cylinder and communicating with the atmosphere, said movable wall having an internal diaphragm chamber therein, a first generally tubular valve member slidably supported in said tubular projection of said movable wall and extending into said diaphragm chamber for abutment with the rear wall of said diaphragm chamber, an inner end closure member threadedly connected to the end of said tubular valve member extending into said diaphragm chamber and having an axially extending valve port therethrough, a valve seat inside of said first generally tubular valve member surrounding said valve port, a valve closure member in said generally tubular valve member biased against said valve seat for regulating the flow of atmospheric pressure from said tubular projection into said diaphragm chamber, a second axially positioned tubular projection on the rear wall of said diaphragm chamber extending into said diaphragm chamber and adapted to project into said valve port of said first valve member, a valve seat on the end of said second tubular projection adapted to abut said valve closure member, means communicating vacuum to the rear opposed power chamber, means communicating said rear opposed power chamber with the inside of said second tubular projection of said movable wall, a reaction diaphragm affixed to said first valve member by said threadedly attached closure member, and means operatively connected to said first generally tubular valve member and projecting through said first tubular projection of said movable wall for moving said first generally tubular valve member toward said second tubular projection of said movable wall to cause said valve seat on said second tubular projection to abut said valve closure member and thereafter move the valve closure member away from its seat in said first generally tubular valve member, whereby simple and reliable structure is provided for maintaining vacuum in both opposing chambers until said tubular valve member is moved rearwardly.

References Cited in the file of this patent
UNITED STATES PATENTS

| 1,687,047 | Trail | Oct. 9, 1928 |
| 1,803,314 | Bragg | May 5, 1931 |
| 2,185,449 | Veenschoten | Jan. 2, 1940 |
| 2,197,075 | Fitzgerald | Apr. 16, 1940 |
| 2,690,740 | Hupp | Oct. 5, 1954 |
| 2,745,383 | Hupp | May 15, 1956 |

FOREIGN PATENTS

| 185,550 | Switzerland | July 31, 1936 |